United States Patent [19]

Macken

[11] Patent Number: 5,717,811
[45] Date of Patent: Feb. 10, 1998

[54] OPTICAL FIBER ORGANIZER

[75] Inventor: Luk Jozef Macken, Antwerpen, Belgium

[73] Assignee: N.V. Rachem S.A., Belgium

[21] Appl. No.: 612,918

[22] PCT Filed: Sep. 2, 1994

[86] PCT No.: PCT/GB94/01910

§ 371 Date: Mar. 6, 1996

§ 102(e) Date: Mar. 6, 1996

[87] PCT Pub. No.: WO95/07483

PCT Pub. Date: Mar. 16, 1995

[30] Foreign Application Priority Data

Sep. 8, 1993 [GB] United Kingdom ............... 9318632

[51] Int. Cl.⁶ .................................................. G02B 6/36
[52] U.S. Cl. .................................................. 385/135
[58] Field of Search ............................... 385/134, 135

[56] References Cited

U.S. PATENT DOCUMENTS

| | | | |
|---|---|---|---|
| 4,595,255 | 6/1986 | Bhatt et al. | 385/135 |
| 4,627,686 | 12/1986 | Szentesi | 385/135 |
| 4,840,449 | 6/1989 | Ghandeharizadeh | 385/135 |
| 4,886,336 | 12/1989 | Deusser et al. | 385/135 |
| 4,911,521 | 3/1990 | Ryuto et al. | 385/135 |
| 4,976,510 | 12/1990 | Davila et al. | 385/135 |
| 5,013,121 | 5/1991 | Anton et al. | 385/135 |
| 5,206,927 | 4/1993 | Finzel et al. | 385/135 |

FOREIGN PATENT DOCUMENTS

| | | | |
|---|---|---|---|
| 0178179 | 4/1986 | European Pat. Off. . | |
| 0202994 | 11/1986 | European Pat. Off. . | |
| 0350245 | 1/1990 | European Pat. Off. . | |
| 0593927 | 4/1994 | European Pat. Off. . | |
| 2559916 | 8/1985 | France . | |
| 2 573 544 | 5/1986 | France | 385/135 |
| 3706518 | 9/1988 | Germany . | |
| 60-196704 | 10/1985 | Japan | 385/135 |
| 2255652 | 11/1992 | United Kingdom . | |
| WO 90 12334 | 10/1990 | WIPO . | |
| WO 90/15351 | 12/1990 | WIPO | 385/135 |
| WO 91 10927 | 7/1991 | WIPO . | |
| WO 92/22842 | 12/1992 | WIPO | 385/135 |

Primary Examiner—John Ngo
Attorney, Agent, or Firm—Herbert G. Burkard; Bruce M. Bertram; William D. Zahrt, II

[57] ABSTRACT

An optical fibre organizer, which comprises:
1. first and second ports through which optical fibres can pass;
2. an organizer drum positioned with respect to the ports such that a fibre passing between them is constrained by an outer surface of the drum to a minimum bend radius at least equal to the critical bend radius of that fibre;

in which the drum is hollow allowing a free end of the fibre to pass from one of the ports to the interior of the drum and to be stored therein at a minimum bend radius greater than at which it suffers permanent damage.

6 Claims, 9 Drawing Sheets

OPTICAL FIBER ORGANIZER

The present invention relates to various components for use in an optical fibre network, in particular for splicing, terminating and splitting.

BACKGROUND OF THE INVENTION

Optical fibres are in general very small, brittle and therefore easily damaged and as a result great care must be taken in their installation and use. In order to avoid damage and light loss, a fibre must not be bent excessively and it must not be subject to unfavourable environmental conditions. As is well know, each fibre has a so-called critical bend radius below which light will be lost from the fibre. Therefore, an optical fibre system must be so configured that none of its fibres is bent at a bend radius below this critical value. Also, fibres must not be even temporarily bent during installation below a smaller bend radius at which permanent damage will occur. These requirements put constraints on the design of components for optical fibre networks.

The components in an optical fibre system are required to organize cables and their component optical fibres at, for example, cable terminations, cable splices and fibre splitters. This involves careful fibre routing, for example to allow easy access to each of many fibre splices, and storage of spare lengths of fibre.

Many proposals have been made to satisfy these requirements. For example, U.S. Pat. No. 4,840,449 (AT&T) discloses an optical fibre organizer and splicing arrangement that permits storage of variable lengths of surplus fibre. The organizer has a pair of separated cylinders extending from a first rectangular section of a base plate and a splice tray having opposite entrance sides for optical fibre in a second rectangular section. The surplus fibre is directed around one or both cylinders and underneath the splicing tray through a plurality of different length passageways so that the varying lengths of optical fibre are stored. Clockwise, counter-clockwise and figure 8 loops are used so that each optical fibre end is directed to a predetermined entrance side of the splicing tray without violating the fibre bend radius restriction.

U.S. Pat. No. 4,627,686 (Siecor) discloses a splicing tray for optical fibres and optical fibre cables comprising three elements: a base, a number of optical fibre storage means associated with the base and an optical fibre receiving means attached to the base. Around the periphery of the base is a plurality of upstanding sidewall members, the terminal portion of which is curved inwardly towards the centre of the base.

SUMMARY OF THE INVENTION

We have now designed an organizer that is able to deal both with live fibre (i.e. that through which a signal is to be transmitted) and dark fibre (i.e. a free end of fibre that is being stored for possible future use).

Thus, the invention provides an optical fibre organizer which comprises:
1. first and second ports through which optical fibres can pass;
2. an organizer drum positioned with respect to the ports such that a fibre passing between them is constrained by an outer surface of the drum to a minimum bend radius at least equal to the critical bend radius of that fibre;

in which the drum is hollow allowing a free end of the fibre to pass from one of the ports to the interior of the drum and to be stored therein at a minimum bend radius greater than at which it suffers permanent damage.

We prefer that the organizer comprise first, second and third ports and that first and second organizer drums be provided. In this case, the drums are positioned with respect to the ports such that:
(a) a fibre passing from the first port to the second port is constrained by an outer surface of the first drum to the required bend radius;
(b) a fibre passing from the first to the third port or from the second to the third port is constrained by outer surfaces of the first and second drums to the required bend radius.

The drums are preferably substantially cylindrical, and preferably of substantially circular cross-section. They may however vary in size or shape along their length, for example they may be waisted, in order to locate the fibre that is wrapped around them at a certain position around their length. The drums need not be made of sheet material, and may instead comprise a frame: references to the shape of the drums refers to their envelope, as would be followed by fibre wrapped around them.

The organizer preferably has at least two input ports at one end thereof, and at least two outlet ports at an opposite end thereof. The two outlet ports are preferably provided one at each side of the organizer, and a row of at least eight inlet ports is preferably provided from one side of the organizer to the other.

The organizer is preferably substantially symmetrical (particularly by reflective symmetry) about a plane between the two drums, such that fibre from any of the input ports can leave through either outlet port.

Where more than one drum is provided we prefer that each drum be hollow since this will allow greater flexibility in the storage of dark fibre. The or each hollow drum may have a hole or slot in a wall thereof through which a fibre from one of the ports can pass.

At least one port may have bend control means, such as curved wall, adjacent that port to direct a fibre passing through that port towards one of the drums at the required bend radius.

The organizer may be of unitary construction, and is conveniently manufactured by moulding from a suitable plastics material.

The organizer may additionally comprise at least one organizer tray fed by fibres from any of the ports.

In a preferred embodiment, the invention provides an optical fibre organizer having a first face partially bound by first and second opposite edge portions, the first face:
1. bearing a plurality of inlet ports arranged along the first edge portion;
2. bearing an outlet port at each side of the second edge portion;
3. bearing two organizer drums positioned between the first and second edge portions; and
4. having a through port that extends through it to an opposite face of the organizer;
5. the inlet ports comprising a row of slots for receipt of fibre tube-terminating devices and a series of curved walls (each of which is preferably continuous along its length, but may comprise a series of posts) for constraining fibres leaving said tubes to a minimum bend radius equal to at least the critical bend radius of the fibre;

the drums being such that a fibre passing between any of the walls and the outlet port is constrained by an outer surface of one or both drums to a minimum bend radius at least equal to the minimum bend radius of the fibre, at least one drum being hollow allowing a free end of fibre to pass from one of the ports to the interior of the drum and to be stored therein at a minimum bend radius greater than that at which it suffers permanent damage;

the through port extending from a convex portion of the face at an angle to its radius vector at that portion such that a fibre extending through the port and over that convex surface is constrained to a minimum bend radius at least equal to its critical bend radius.

BRIEF DESCRIPTION OF THE DRAWINGS

The invention is further illustrated with respect to the accompanying drawings, in which.

DESCRIPTION OF THE PREFERRED EMBODIMENTS

Figure 1:
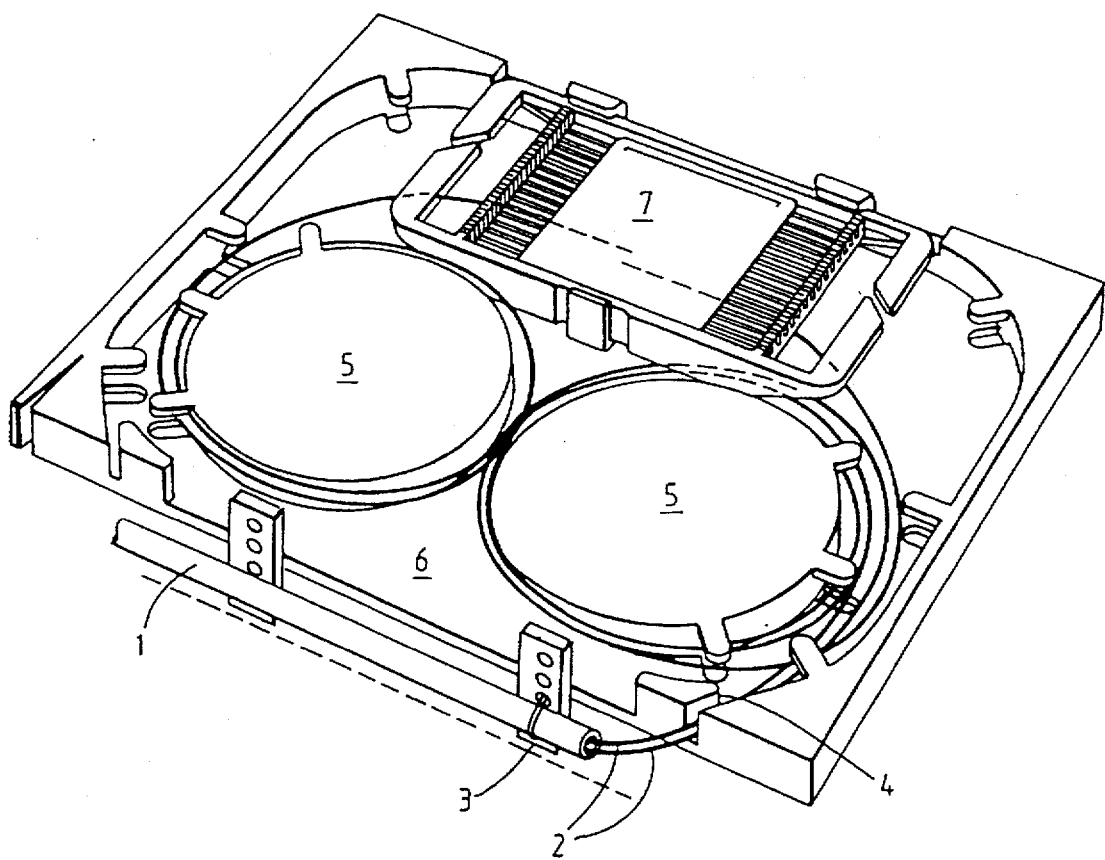
FIGS. 1 and 2 show prior art optical fibre organizers.

FIG. 1 shows a prior art optical fibre organizer as disclosed in U.S. Pat. No. 4,840,449 (AT&T). An optical fibre cable 1 containing optical fibres 2 is secured to an optical fibre organizer by means of a cable tying post 3. The fibres pass through an inlet port 4 and are stored around drums 5 protruding from a face 6. The optical fibres pass under a splicing tray 7 where a splice between them is secured. It may be noted that there is no means for individually organizing a plurality of incoming cables or fibres, there is no way of dealing with dark fibre, and only cables entering in the plane of the face 6 can be dealt with.

Figure 2:
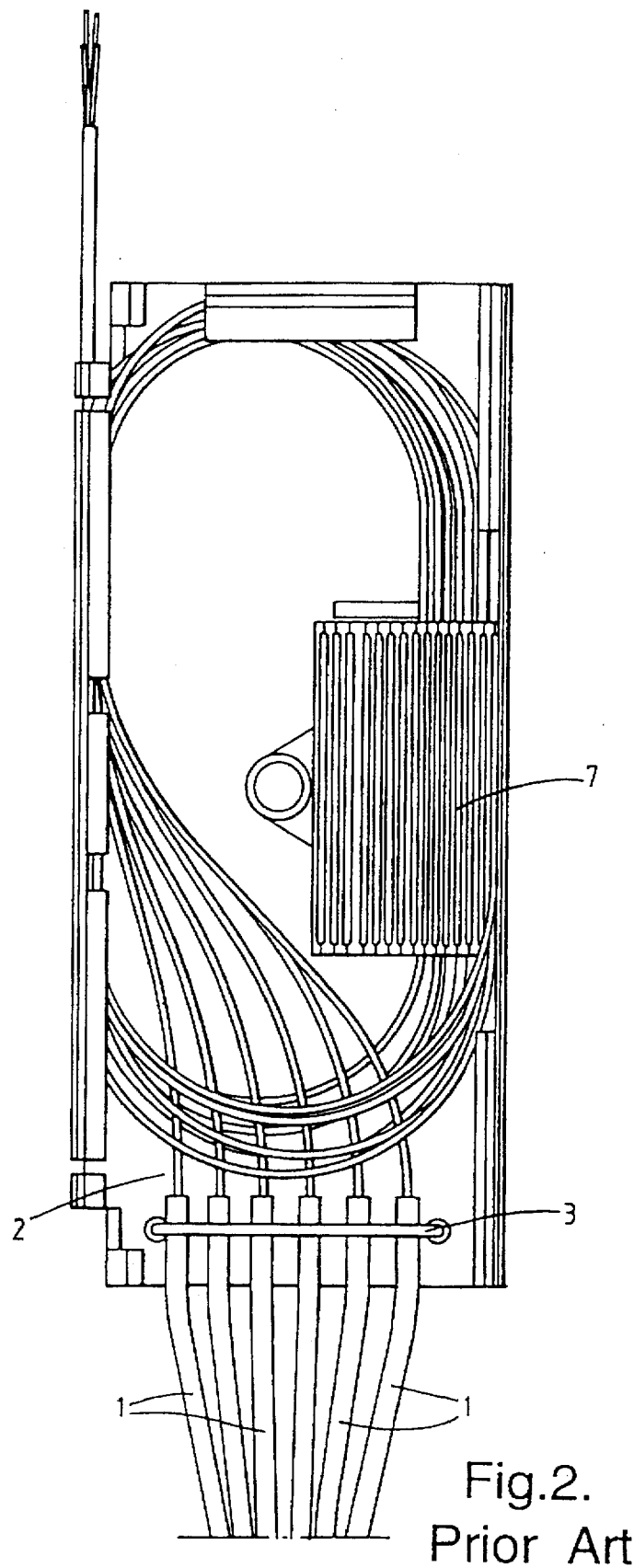

A prior art optical fibre organizer disclosed in U.S. Pat. No. 4,627,686 (Siecor) is shown in FIG. 2. Here incoming cables 1 are arranged side-by-side and the fibres 2 they contain are simply routed around the base of the organizer and are retained by its side walls. The cables are held in place by a clamp 3. A fibre receiving means 7 comprises a series of slots which can retain fibre splices for connection to the outgoing cable shown at the top left of the figure. Although this design allows several incoming cables 1 to be terminated the design allows little flexibility in routing or storage.

Figure 3:
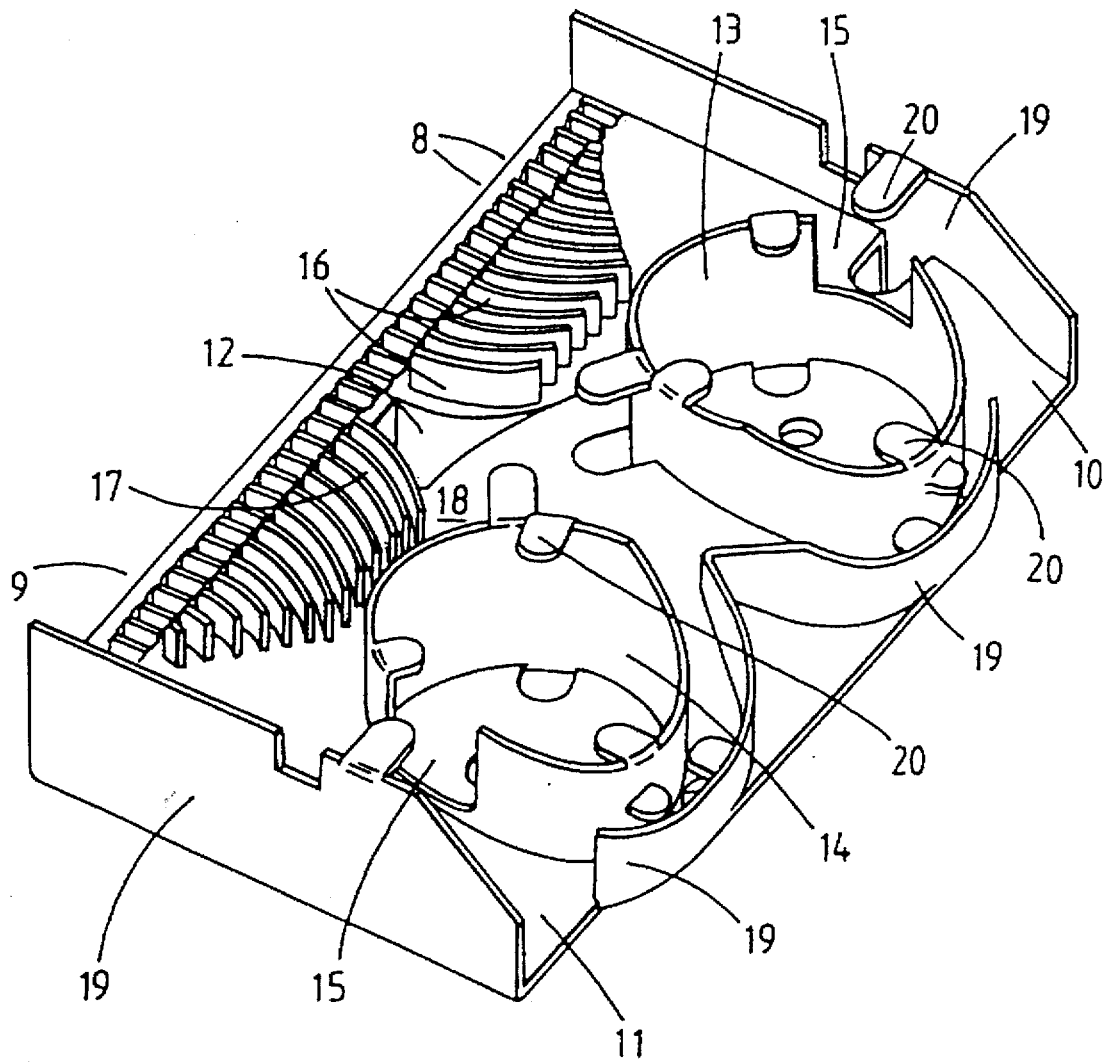
FIG. 3 is a perspective view of an organizer of the invention.

FIG. 3 shows an optical fibre organizer having a first face partially bound by first (top-left as drawn) and second (lower right as drawn) opposite edge portions, a first face:

(1) bearing a plurality of inlet ports 8, 9 arranged along the first edge portion;

(2) bearing an outlet port 10, 11 at each side of the second edge portion;

(3) bearing two organizer drums 13, 14 positioned between the first and second edge portions; and (4) having a through port 12 that extends through it to an opposite face of the organizer;

the inlet ports 8, 9 comprising a row of slots for receipt of fibre tube terminating devices (preferably the fibre break-out devices of FIGS. 6A to E) and a series of curved walls 16, 17 for constraining fibres leaving said tubes to a minimum bend radius equal to at least the critical bend radius of the fibre.

(These slots may conveniently be referred to as ports since their function is to locate incoming fibres; it should be noted however that the fibres do not pass through the slots.)

The drums 14, 15 are preferably such that a fibre passing between any of the walls 16, 17 and the outlet ports 10, 11 is constrained by an outer surface of one or both drums 13, 14 to a minimum bend radius at least equal to the critical bend radius of the fibre, the drums 13, 14 preferably being hollow allowing a free end of fibre to pass from one of the ports, generally one of the inlet ports 8, 9, to the interior of the drums. The fibres will be stored in the drums at a minimum bend radius greater than that at which they suffer permanent damage. This minimum bend radius may be larger than the critical bend radius of the fibre since it is permanent damage rather than light loss that is of concern in the case of the dark fibre.

The through port 12 extends from a convex portion 18 of the face of the organizer at an angle to its radius vector at that portion (i.e. not radially and preferably close to tangentially) such that a fibre extending through the port 12 and over convex surface 18 is constrained to a minimum bend radius at least equal to its critical bend radius.

The organizer preferably has side walls or other retaining means 19 and the drums preferably have hooks or other retaining means 20 that help guide the fibres.

Figure 4A:
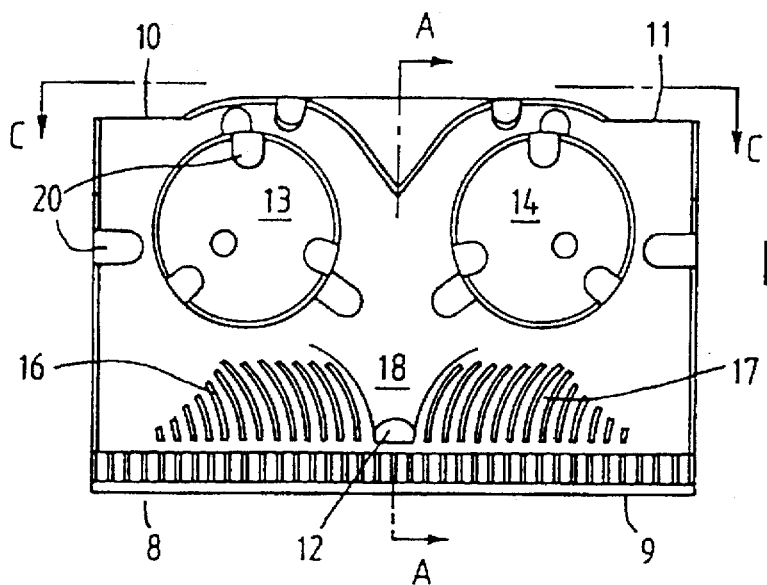
FIGS. 4A to E show various other views of the organizer.
Figure 4B:
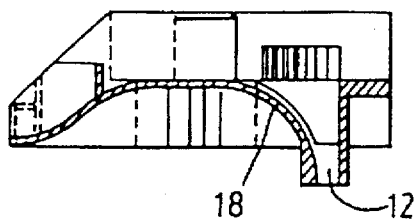
Figure 4C:
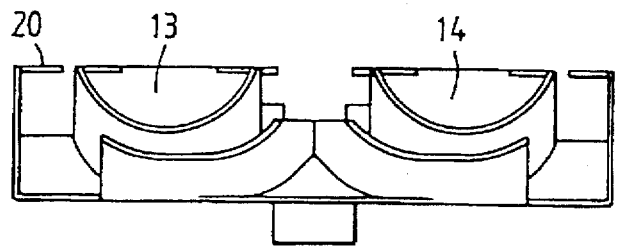
Figure 4D:
Figure 4E:

Further views of the organizer can be seen in FIGS. 4A to 4E. In FIG. 4A for example it can be seen that walls 12A of the through port 12 curve along a path towards the drums 13, 14. This curvature may result from a progressive broadening of the cross-sectional size of the through port 12 towards the face illustrated in FIG. 4A. As a result, the through port 12 includes a substantially straight passage from one face to the opposite face allowing easy insertion of optical fibres. This can be seen best, perhaps, in FIG. 4B. It can be seen therefore that a fibre passing through the through hole 12 towards the drums 13, 14 is constrained to a given minimum bend radius.

The drums 13, 14 can be seen, particularly from FIG. 3, to be hollow thus allowing a free end of fibre to pass from one of the ports to the interior of the drums where it can be stored. The hollow drums have slots 15 in their walls through which such fibre can pass.

The inlet ports 8, 9 can be seen to have bend control means in the form of substantially mutually concentric curved walls 16, 17. The organizer shown has reflective symmetry about line AA and as a result the bend control means are arranged in two groups 16, 17, where the walls curve in opposite directions.

Figure 5A:
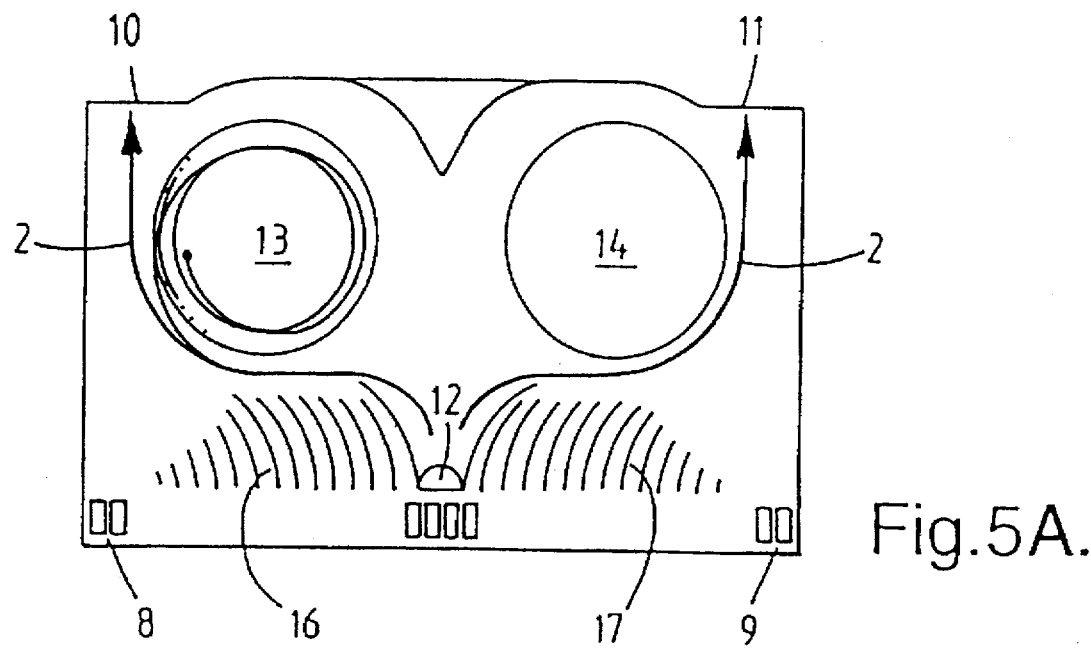
FIGS. 5A to E show various fibre routes through the organizer.

FIGS. 5A to E show the flexibility of the organizer in accommodating various configurations and lengths of fibre. In FIG. 5A fibre enters the organizer from through hole 12 and leaves through outlets 10 and 11. Also, some dark fibre leaves through hole 12 and is stored in drum 13. The organizer here is intended to be used with other components such as optical fibre splice trays accommodating fibre splices and/or fibre splitters. The organizer will be aligned with a base plate carrying such trays, on the right-hand side of which there may be a channel for accommodating fibres entering the splice trays, and on the left-hand side of which there may be a channel accommodating fibres leaving the splice trays. These passages may be referred to arbitrarily as an in trench and an out trench, although this is not intended to imply any direction of light travel.

Figure 5B:
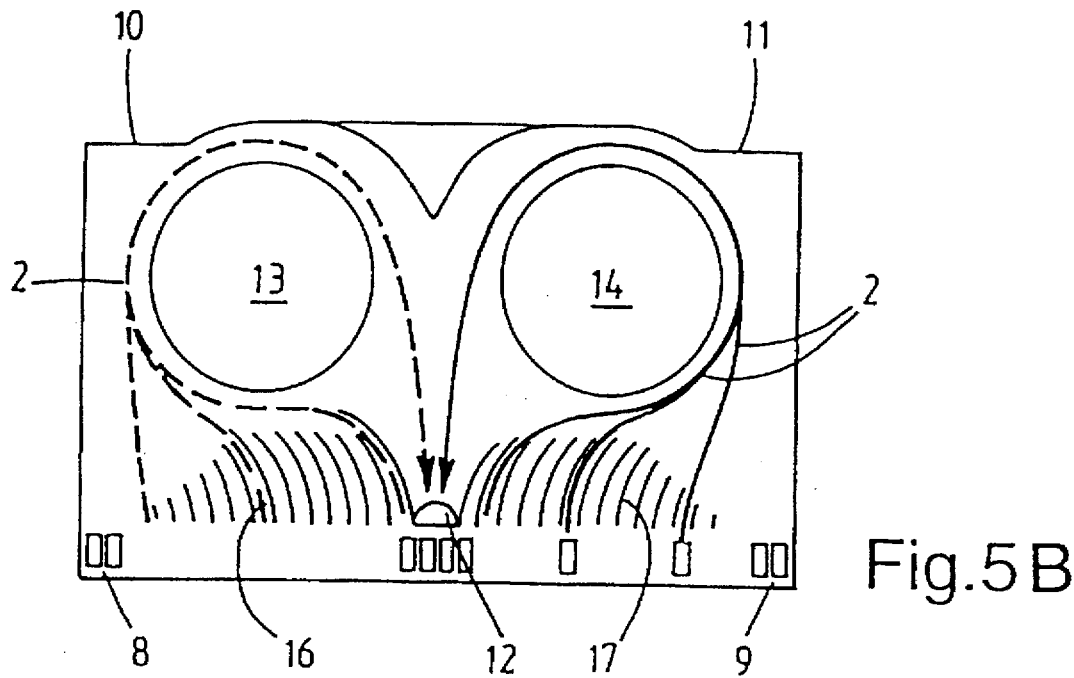

In FIG. 5B fibres enter through inlet ports 8 (only a few of which are shown), pass through bend control means 16 and leave the organizer via through hole 12. Also, fibres enter through inlet ports 9, pass through bend control means 17 and exit again via through hole 12.

Figure 5C:
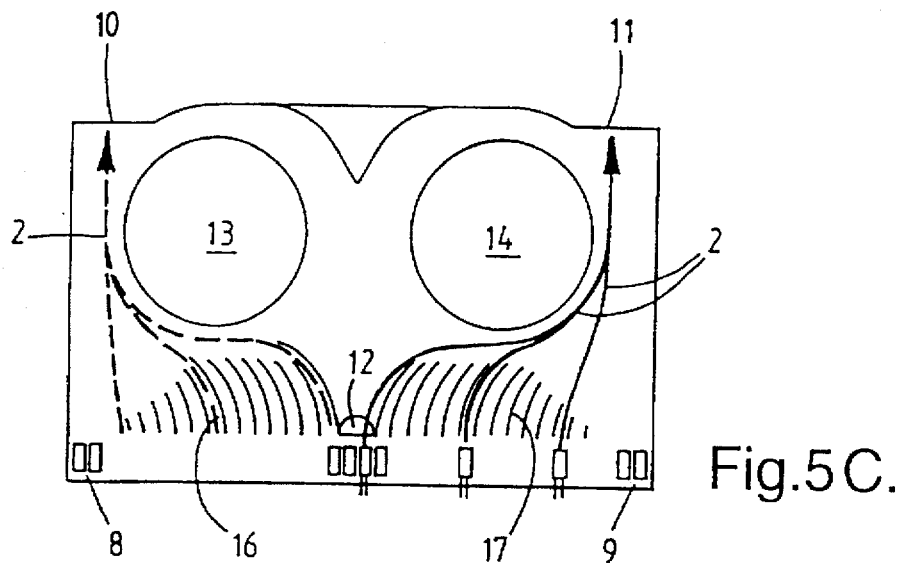

In FIG. 5C fibres enter through inlet ports 8 and leave through outlet port 10, and enter through inlet ports 9 and leave through outlet port 11.

Figure 5D:
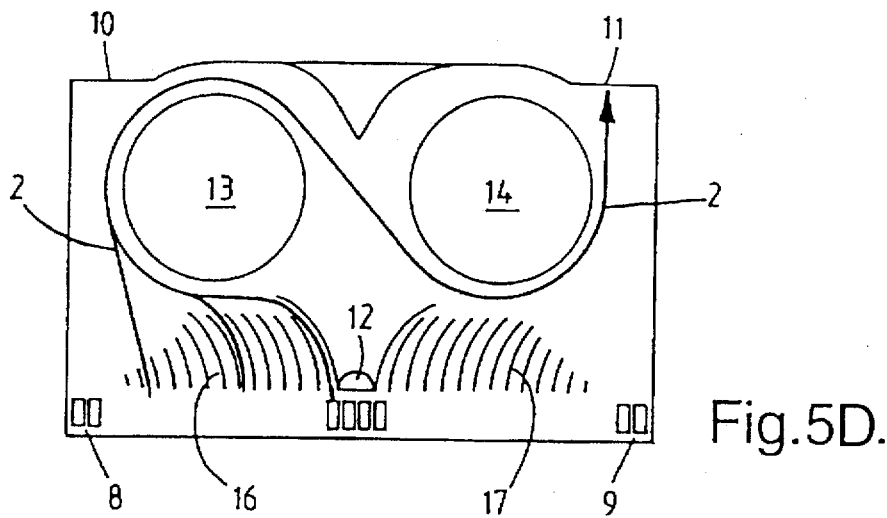

In FIG. 5D fibres enter through inlet ports 8 and leave through outlet port 11.

Figure 5E:
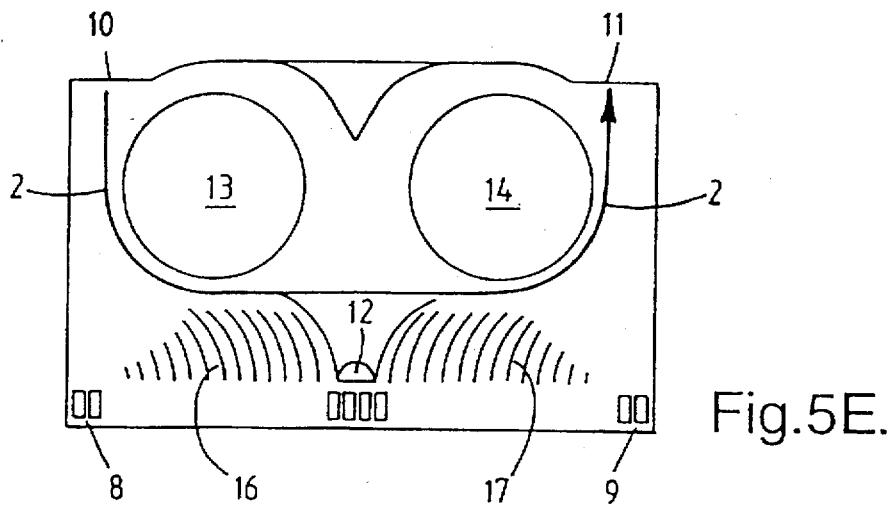
Figure 6A:
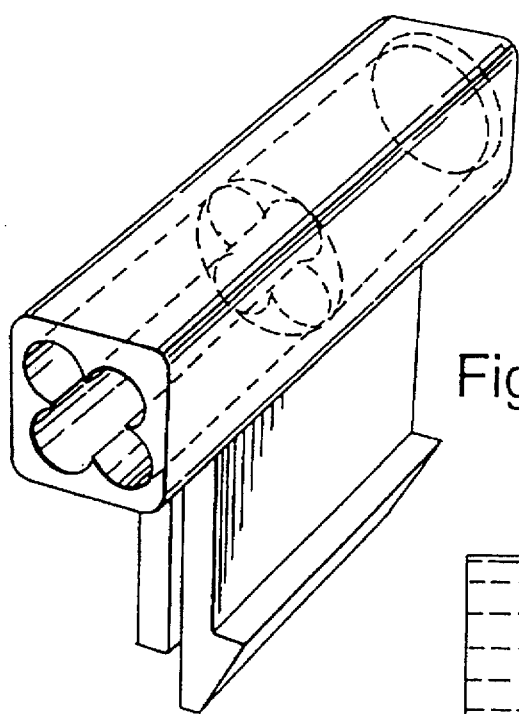
FIGS. 6A to E show an optical fibre break-out device.
Figure 6C:
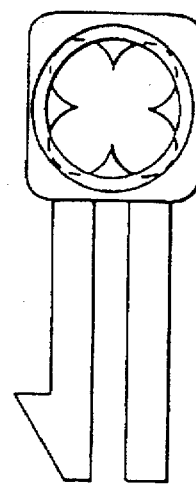
Figure 6B:
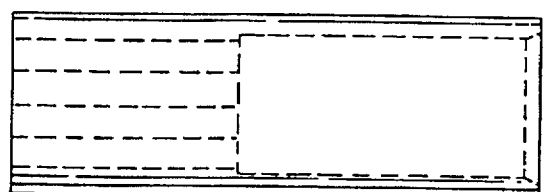
Figure 6D:
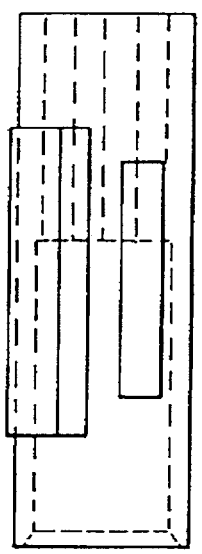
Figure 6E:
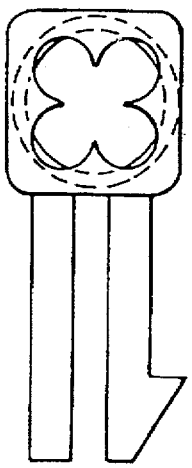

In FIG. 5E fibres enter through outlet port 10 and leave through outlet port 11.

An optical fibre break-out device is shown in FIGS. 6A to E. It may be removably secured into, for example, the slots comprising the inlet ports 8, 9 of the organizer of FIG. 3. This can be done by means of a resilient detent comprising for example the two legs illustrated, one of which is barbed to engage a lower surface of the wall defining the slot. The break-out device can be seen to have a first passage for retaining a larger fibre tube (shown dotted at the upper right-hand side) and four second passages (at the lower left hand end as drawn) for retaining a plurality of smaller fibre tubes. Fibres in such tubes can be seen to be able to pass between the larger tube and each smaller tube without bending that would cause significant light loss. In the embodiment illustrated the four second passages comprise a single passage partially sub-divided by inwardly extending protrusions for retention of the tubes therein. The precise shape of such protrusions is not critical, but in a preferred embodiment the protrusions result from the second passages having a cross-section substantially that of a plurality of partially overlapping circles In this way, the tubes are retained by interference fit. Although four second passages are shown, other numbers for example from 2–6 may be provided.

Figure 7:
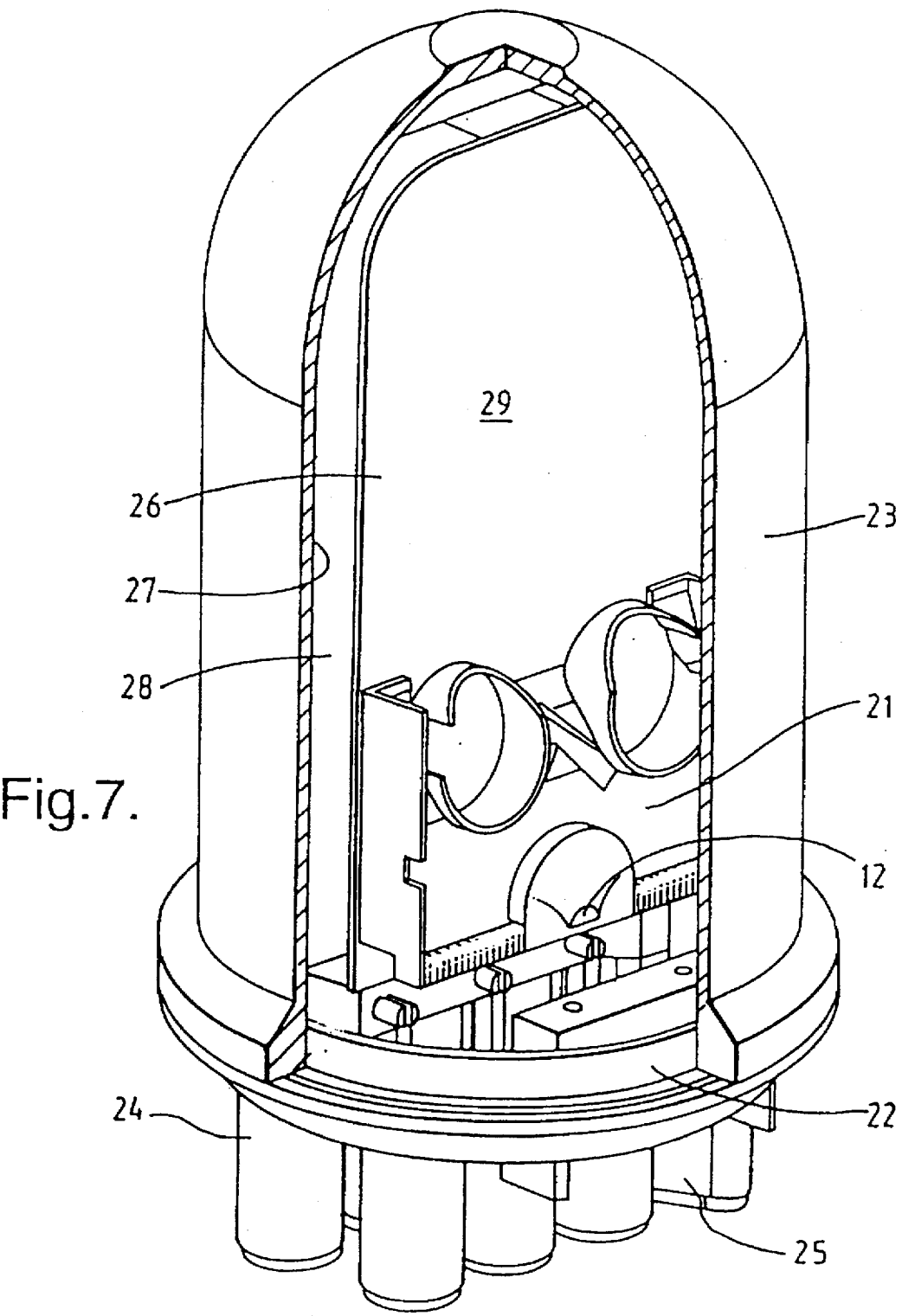
FIG. 7 shows a cable splice case incorporating the optical fibre organizer.

FIG. 7 shows an organizer 21 as described above sealed within a splice closure, shown in cut-away to expose the organizer 21. The splice closure comprises a base 22 and a dome-shaped cover 23. The base 22 carries various circular ports 24 and an oval port 25. Attached to the base is a frame or other support 26 to which the organizer 21 is attached. A second support or frame 27 is provided separated from frame or support 26 by a gap 28. This gap 28 may contain loops of fibre from incoming and outgoing cables that are not spliced within the enclosure and therefore by-pass organizer 21. A second organizer 21 may be provided on the back of the frame or support 27, and therefore out of view. The two organizers may then be in communication via their through holes 12. Organizer trays may be provided in space 29 carrying fibre splices and/or fibre splitters. Thus, cables entering the port 25 may be split such that some of the fibres they contain enter the organizer 21 as illustrated in FIGS. 5A to 5E, and may leave organizer 21 to splice trays positioned in space 29. There, the fibres will be spliced or split and the fibres to which they are spliced or into which they are split may re-enter the organizer 21 and finally leave it, again as shown in FIGS. 5A to 5E. Other fibres from the incoming cable may be looped in space 28 and then exit through the port. In general this will be done by taking a loop of cable of approximately two meters length which loop is inserted into oval port 25. Some of the fibres constituting that loop will simply be stored in space 28, and others will be cut and fed to the organizer 21. That loop of cable may form part of a ring or spur in a fibre optic network. The fibres leaving circular ports 24 after being spliced to the cut fibres of that loop may pass to subscribers or may be used to form a further spur.

Figure 8:
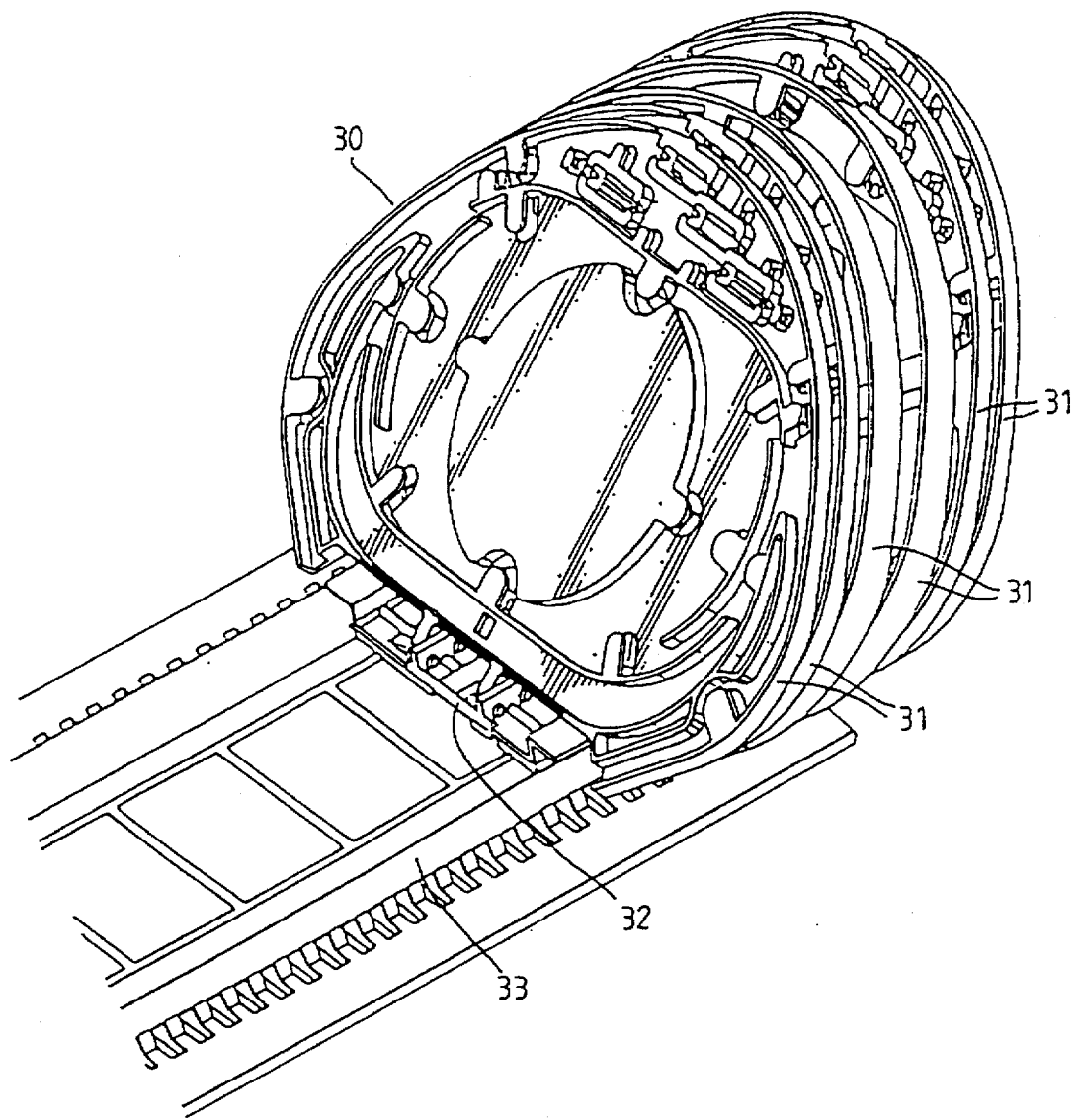
FIG. 8 shows a series of organizer trays for use with the organizer.

FIG. 8 illustrates optical fibre trays that may be positioned in space 29 or otherwise used in conjunction with organizer 21.

The module 30 illustrated in FIG. 8, which may be preinstalled with fibres, comprises a series of trays 31 hinged to a mounting device 32 which is in turn fixed to a base 33. The trays 31 can be seen to have means for storing loops of fibres and for securing fibre splices or fibre splitters. This module may be snap-fitted or otherwise attached at space 29 of FIG. 7 and the fibres it contains then spliced to those leaving the organizer 21.

For the avoidance of doubt it is noted that the invention provides various components, assemblies, systems and methods for organizing, storing and protecting optical fibres. Any of the various components disclosed may be used with any one or more other such components.

I claim:

1. An optical fibre organizer having a first face partially bound by first and second opposite edge portions, the first face:

(1) bearing a plurality of inlet ports arranged along the first edge portion;

(2) bearing an outlet port at each side of the second edge portion;

(3) bearing two organizer drums positioned between the first and second edge portions; and (4) having a through port that extends through it to an opposite face of the organizer;

the inlet ports comprising a row of slots for receipt of fibre-tube-terminating devices and a series of curved walls for constraining fibres leaving said tubes to a minimum bend radius equal to at least the critical bend radius of the fibre;

the drums being such that a fibre passing between any of the walls and the outlet ports is constrained by an outer surface of one or both drums to a minimum bend radius at least equal to the minimum bend radius of the fibre, at least one drum being hollow allowing a free end of fibre to pass from one of the ports to the interior of the drum and to be stored therein at a minimum bend radius greater than that at which it suffers permanent damage;

the through port extending from a convex portion of the face at an angle to its radius vector at that portion such that a fibre extending through the port and over that convex surface is constrained to a minimum bend radius at least equal to its critical bend radius.

2. An organizer according to claim 1, which is substantially symmetrical, about a plane between the two drums, such that fibres from either input port can leave either output port.

3. An organizer according to claim 1, in which each of the drums is hollow allowing a free end of fibre to be passed from one of the ports to the interior of either drum and be stored therein at a minimum bend radius greater than that at which it suffers permanent damage.

4. An organizer according to claim 1 in which the or each hollow drum has a hole or slot in a wall thereof through which a fibre from one of the ports can pass.

5. An organizer according to claim 1 of unitary construction.

6. An organizer according to claim 1, which additionally comprises at least one organizer tray fed by fibres from the outlet ports.

* * * * *